United States Patent [19]
Miyashita

[11] Patent Number: 5,164,572
[45] Date of Patent: Nov. 17, 1992

[54] ABNORMAL TEMPERATURE DETECTION DEVICE FOR REGENERATION RESISTOR

[75] Inventor: Hideo Miyashita, Hino, Japan

[73] Assignee: Fanuc Ltd., Minamitsuru, Japan

[21] Appl. No.: 571,648

[22] PCT Filed: Jan. 10, 1990

[86] PCT No.: PCT/JP90/00026
§ 371 Date: Sep. 4, 1990
§ 102(e) Date: Sep. 4, 1990

[87] PCT Pub. No.: WO90/08947
PCT Pub. Date: Aug. 9, 1990

[30] Foreign Application Priority Data
Jan. 24, 1989 [JP] Japan .................. 1-14625

[51] Int. Cl.⁵ ............................ H05B 1/02
[52] U.S. Cl. ..................... 219/505; 219/494; 219/490
[58] Field of Search ........... 219/505, 511, 508, 491, 219/490, 494, 497

[56] References Cited
FOREIGN PATENT DOCUMENTS
52-56113 10/1975 Japan .
0171547 4/1981 Japan .
64-10676 1/1989 Japan .

Primary Examiner—Mark H. Paschall
Attorney, Agent, or Firm—Staas & Halsey

[57] ABSTRACT

There is provided an abnormal temperature detection device for a regeneration resistor for consuming the regenerative energy of an electric motor, which includes a heat conductive member (11) disposed in contact with the surface of a regeneration resistor (1), and a thermostat for detecting a rise in the temperature due to an abnormal heat generated in the regeneration resistor (1), via the thermostat (12). The thermostat (12) the regeneration resistor (1) are disposed in different spaces. The thermostat (12) is mounted on a portion at which the temperature is lowered, via the heat conductive member (11), and the temperature of that portion is detected instead of directly detecting the surface temperature of the regeneration resistor (1) which is set at high temperatures. Accordingly, a high temperature state of the regeneration resistor (1) can be detected by using a thermostat able to detect a low temperature.

3 Claims, 2 Drawing Sheets

ABNORMAL TEMPERATURE DETECTION DEVICE FOR REGENERATION RESISTOR

Background of the Invention

This invention relates to an abnormal temperature detection device for a regeneration resistor which processes the regenerative energy of an electric motor or the like by heat generation. More particularly, the present invention relates to an abnormal temperature detection device for a regeneration resistor in a small-sized spindle motor, servomotor or the like used in an NC machine tool or industrial robot.

A regeneration resistor is mounted on a small-sized spindle motor, servomotor or the like used in an NC machine tool or industrial robot, to consume a regenerative energy thereof.

To detect an abnormal temperature of the regeneration resistor, the regeneration resistor is covered with cement and set into a metal case, to thereby increase the surface area of the regeneration resistor so as to suppress a rise in the temperature thereof. A thermostat is mounted on the surface of the metal case, whereby when an abnormal increase of the temperature of the regeneration resistor occurs, the abnormal temperature is detected and countermeasure is taken by, for example, turning off the power source of the numerical control device.

When the operation of a cooling fan for forcibly air-cooling the regeneration resistor is interrupted, or a transistor of a control circuit for controlling the current in the regeneration resistor becomes defective, the temperature of the regeneration resistor becomes higher. Therefore, a correct detection of an abnormal temperature rise must be realized.

Nevertheless, since the regeneration resistor is formed by only a resister, a metal case, and an insulation member for isolating these members from each other, the surface temperature of the regeneration resistor is as high as several hundred ° C. even during a normal operation. Therefore, if a thermostat which is generally used at such high temperatures is set in direct contact with the regeneration resistor, the solder therein may melt or the metal portion max oxidize.

Further, the regeneration resistor is forcibly air-cooled by a cooling fan to suppress any rise in the temperature of the regeneration resister. Therefore, a defect in the insulation in the thermostat may be easily caused by dust in the duct, making it difficult to correctly detect the temperature of the regeneration resistor.

Summary of the Invention

An object of the present invention is to provide an abnormal temperature detection device for a regeneration resistor in which a thermostat able to detect temperatures of approximately 100° C. is used to detect temperatures higher than approximately 100° C.

To solve the above-described prior art problems, the present invention provides an abnormal temperature detection device for a regeneration resistor for consuming the regenerative energy of an electric motor. The abnormal detection device comprises a heat conductive member mounted in contact with the surface of the regeneration resistor and a thermostat for detecting a temperature rise due to an abnormal heat generation in the regeneration resistor, via the heat conductive member. The thermostat and the regeneration resistor are provided in different spaces.

The surface temperature of the regeneration resistor, which is set high, is not directly detected. The thermostat is mounted on a portion at which the temperature is lowered via the heat conductive member and the temperature of the portion is detected. As a result, 100° C. can be used to detect temperatures higher than approximately 100° C., thereby making it possible to detect an abnormal heat generated in the regeneration resistor.

DESCRIPTION OF THE PREFERRED EMBODIMENT

An embodiment of this invention will be described with reference to the accompanying drawings.

Figure 1A:
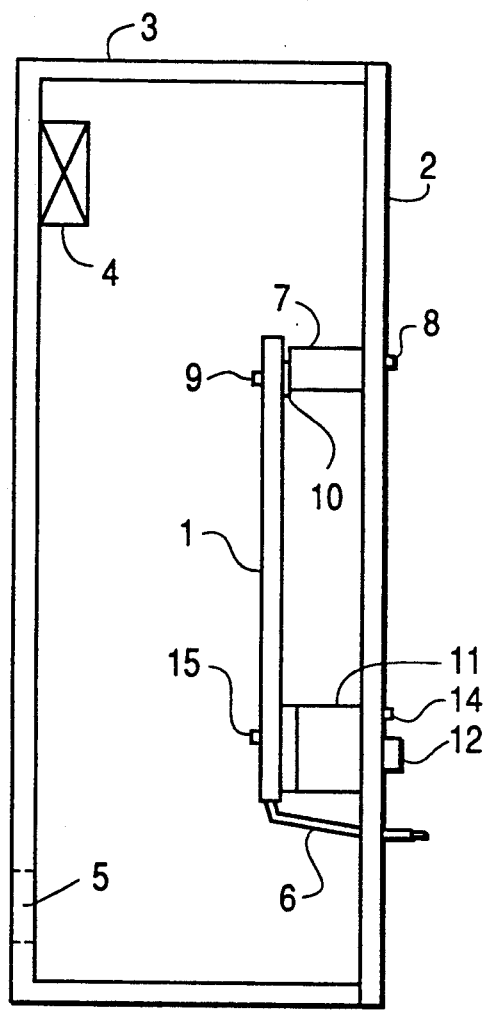
FIGS. 1(a) to 1(c) are diagrams of an embodiment of the present invention.
Figure 1B:
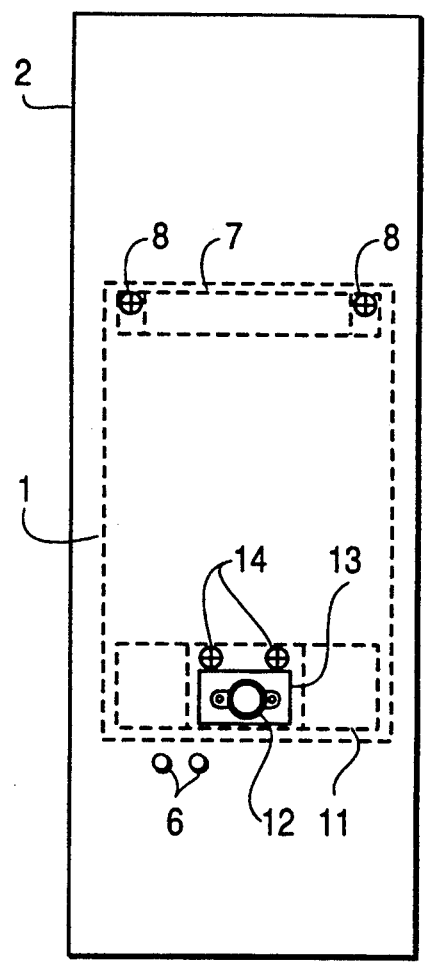
Figure 1C:
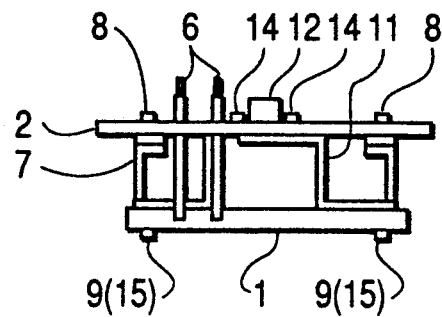

FIGS. 1(a) to 1(c) are diagrams of an embodiment of the present invention A regeneration resistor 1 is set inside a container (duct) formed by a bottom plate 2 and an outer casing 3. In FIGS. 1(b) and 1(c), the outer casing 3 is omitted. A cooling fan 4 and an air inlet port 5 are provided in the outer casing 3. A rotation of the cooling fan 4 causes external cool air to be introduced via the air inlet port 5 to absorb the heat of the regeneration resistor 1, and to be discharged to the exterior via the cooling fan 4.

A wiring 6 for a flow of regenerative current is connected to the regeneration resistor 1. The wiring 6 penetrates the bottom plate 2 and is lead out to the exterior of the duct, and one end of the regeneration resistor 1 is fixed to the bottom plate 2 by a fitting 7. The fitting 7 and bottom plate 2 are fixed together by a screw 8. The fitting 7 and regeneration resistor 1 are fixed together by a screw 9. A heat insulating member 10 is disposed between the fitting 7 and regeneration resistor 1 to prevent a transfer of heat from the regeneration resistor 1 to the bottom plate 2. Mica, ceramic or other similar materials can be used for the heat insulating member 10.

The other end of the regeneration resistor 1 is fixed to the bottom plate 2 by a heat conductive member 11. The heat conductive member 11 is formed by shaping a rectangular metal plate to a concave configuration. A thermostat 12 is mounted on an upper part of a concave portion of the heat conductive member 11. The thermostat 12 is projected toward the exterior of the duct, via an opening 13 of the bottom plate 2. A portion of the duct on the side of the opening 13 extends toward a locker (not shown). The thermostat 12 and the regeneration resistor 1 are disposed in different containers (different spaces). The heat conductive member 11 and bottom plate 2 are fixed together by a screw 14. The heat conductive member 11 is placed in contact with the surface of the regeneration resistor 1 and fixed thereto by a screw 15. A heat insulating member may be disposed between the heat conductive member 11 and the bottom plate 2.

Under normal operating conditions, the temperature of the heat conductive member 11 mounted on the surface of the regeneration resistor 1 is adequately lowered by air flow from the cooling fan 4. Therefore, the temperature of a portion on which the thermostat 12 is mounted becomes lower than the operation temperature of the thermostat 12. Thus, the thermostat 12 which is able to detect temperatures of approximately 100° C. can be used to detect temperatures higher than 100° C.

Figure 2:
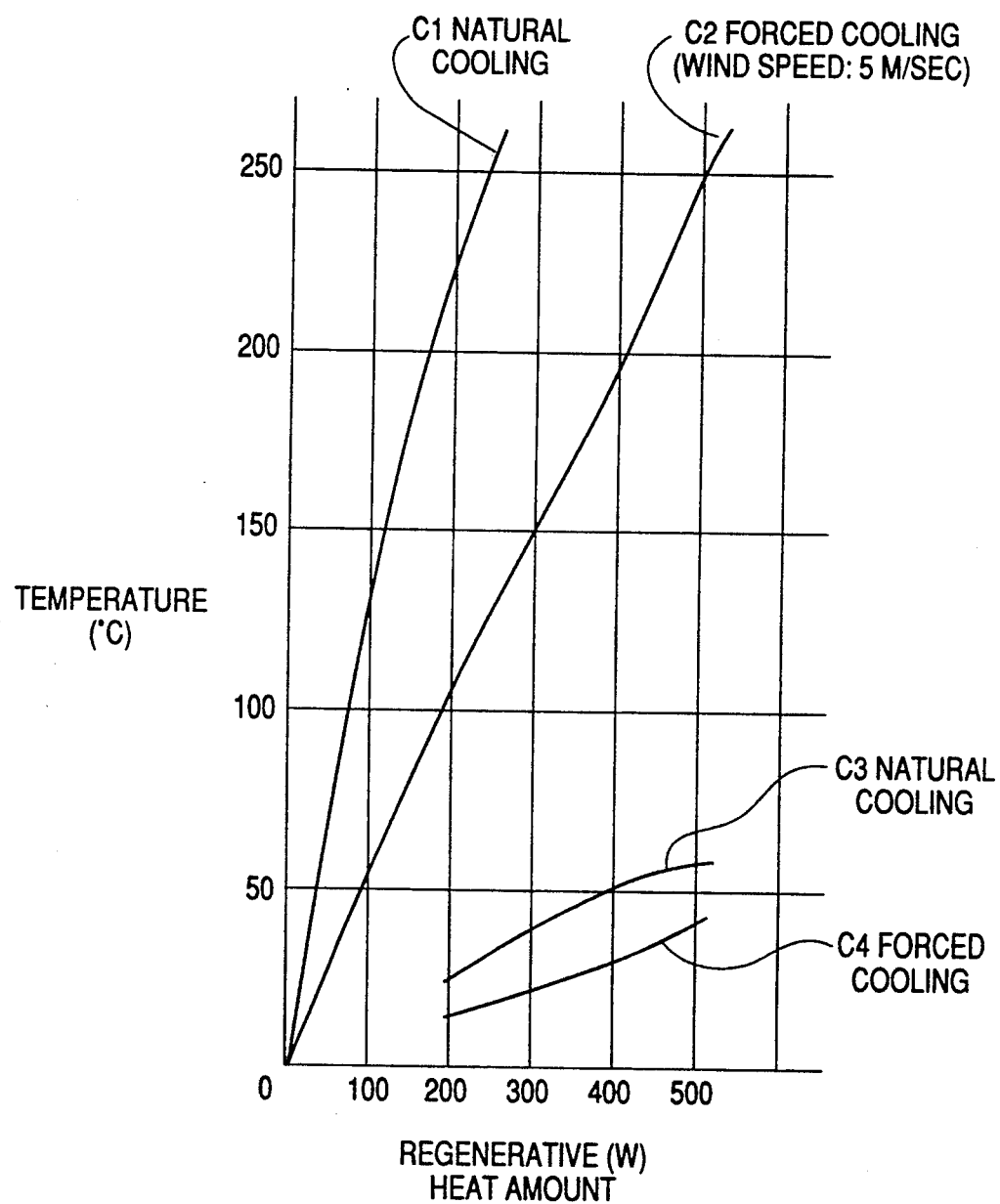
FIG. 2 is a graph of a heat radiation characteristic obtained when a regeneration resistor having a resistance of 16Ω is used in the embodiment.

This is explained with reference to FIG. 2, which shows a heat radiation characteristic obtained when a regeneration resistor having a resistance of 16Ω is used in this embodiment. The abscissa indicates a regenerative heat amount (W) given to the regeneration resistor. The ordinate indicates a rise in the temperature of the regeneration resistor, the indicated temperatures being measured with the ambient temperature and a temperature in the locker set to a reference temperature (0° C.).

A curve C1 indicates a rise in the temperature of the regeneration resistor 1 when the operation of the cooling fan 4 is stopped and a natural cooling is effected. A curve C2 indicates a rise in the temperature of the regeneration resistor 1 itself when the cooling fan 4 is operated to effect a forced cooling operation at a wind speed of b 5 meters/sec. As is clearly seen from the two curves C1 and C2, the temperature of the regeneration resistor 1 becomes higher than 100° C. even when the forced cooling operation is effected, at a regenerative heat amount of 200 W. The temperature thereof becomes higher than 200° C. when the operation of the cooling fan is interrupted and the natural cooling operation is effected.

In contrast, in this embodiment the temperature of a corresponding portion is measured via a heat conductive member 11 as indicated by curves C3 and C4. The curve C3 indicates a rise in the temperature of the thermostat 12 when the operation of the cooling fan 4 is interrupted and a natural cooling operation is effected. The curve C4 indicates a rise in the temperature of the thermostat 12 when the cooling fan 4 is operated to effect the forced cooling operation at a wind speed of 5 meters/sec. As is clearly seen from the curves C3 and C4, the range of the rise in the temperature of the thermostat 12 is approximately 50° C. at most, even when the regenerative heat amount is 500 W. Therefore, a thermostat able to detect temperatures of approximately 100° C. or less than 100° C. can be satisfactorily used to detect an abnormal temperature rise in the regeneration resistor 1. Further, an actual temperature of the regeneration resistor 1 can be derived by effecting a converting operation based on the characteristic diagram of FIG. 2.

If the characteristic of the heat conductive member 11 is adequately selected, the abnormal temperature rise caused by a continuous flow of an excessively large current, due to a defective transistor of a control circuit for controlling a current in the regeneration resistor 1 or an abnormal temperature rise caused by an interruption of the cooling fan 4 for forcibly cooling the regeneration resistor 1, can be detected by the thermostat 12. A countermeasure can be taken by, for example, turning off the power source of the device.

Further, metal is used for the heat conductive member 11 in this embodiment. However, any other heat conductive member 11 can be used. In addition, if the shape of the heat conductive member 11 is determined by taking into consideration the temperature of the regeneration resistor 1, the reduction in the temperature by the air-cooling of the fan 4, and the temperature detected by the thermostat 12 an abnormal rise in the temperature of the regeneration resistor 1 can be detected by using a general thermostat for normal temperatures. Further, in this embodiment, the thermostat 12 and the regeneration resistor 1 are disposed, in different spaces. In particular, the thermostat is disposed in a tightly sealed locker so that contamination due to dust can be prevented, thereby enhancing the reliability of the thermostat 12.

As described above, according to this invention, an abnormal temperature of the regeneration resistor 1 set at temperatures higher than approximately 100° C. can be detected by using a thermostat able to detect temperatures of approximately 100° C.

I claim:

1. An abnormal temperature detection device for a regeneration resistor for consuming a regenerative energy of an electric motor, comprising:
    a heat conductive member mounted in contact with a surface of the regeneration resistor in a cooling duct; and
    a thermostat in a locker for detecting a rise in temperature due to an abnormal heat generated in the regeneration resistor, via said heat conductive member, said thermostat and the regeneration resistor being provided in different spaces.

2. An abnormal temperature detection device for a regeneration resistor according to claim 1, wherein said heat conductive member is formed of a metal plate.

3. An abnormal temperature detection device for a regeneration resistor according to claim 2, wherein said heat conductive member is used as a fitting for the regeneration resistor.

* * * * *

UNITED STATES PATENT AND TRADEMARK OFFICE
CERTIFICATE OF CORRECTION

PATENT NO. :   5,164,572
DATED      :   NOVEMBER 17, 1992
INVENTOR(S) :  HIDEO MIYASHITA

It is certified that error appears in the above-identified patent and that said Letters Patent is hereby corrected as shown below:

TITLE PAGE [57] ABSTRACT,
    line 8, "(12)" should be --(12) and--.

Col. 1, line 45, "max" should be --may--.

Col. 2, line 7, "result, 100°C." should be --result, a thermostat able to detect temperatures of approximately 100°C.--;
    line 24, "invention A" should be --invention. A--.

Col. 3, line 20, "b" should be deleted.

Signed and Sealed this

Twelfth Day of October, 1993

Attest:

BRUCE LEHMAN

*Attesting Officer*      *Commissioner of Patents and Trademarks*